US009739090B2

(12) United States Patent
Karremann

(10) Patent No.: US 9,739,090 B2
(45) Date of Patent: Aug. 22, 2017

(54) CONTROL SYSTEM AND METHOD FOR CONTROLLING THE MOVEMENT OF AN AERIAL APPARATUS

(71) Applicant: IVECO MAGIRUS AG, Ulm (DE)

(72) Inventor: Martin Karremann, Burgrieden (DE)

(73) Assignee: IVECO MAGIRUS AG, Ulm (DE)

( * ) Notice: Subject to any disclaimer, the term of this patent is extended or adjusted under 35 U.S.C. 154(b) by 18 days.

(21) Appl. No.: 14/746,274

(22) Filed: Jun. 22, 2015

(65) Prior Publication Data

US 2015/0376945 A1 Dec. 31, 2015

(30) Foreign Application Priority Data

Jun. 25, 2014 (EP) .................................... 14173886

(51) Int. Cl.

| | |
|---|---|
| ***B60R 22/00*** | (2006.01) |
| ***E05F 15/00*** | (2015.01) |
| ***G05D 1/00*** | (2006.01) |
| ***G05D 3/00*** | (2006.01) |
| ***G06F 7/00*** | (2006.01) |
| ***G06F 17/00*** | (2006.01) |
| ***E06C 5/04*** | (2006.01) |
| ***A62C 27/00*** | (2006.01) |
| ***E06C 5/32*** | (2006.01) |
| ***G05G 9/047*** | (2006.01) |

(52) U.S. Cl.

CPC ................ *E06C 5/04* (2013.01); *A62C 27/00* (2013.01); *E06C 5/32* (2013.01); *G05G 9/047* (2013.01)

(58) Field of Classification Search

CPC .. E06C 5/04; E06C 5/32; A62C 27/00; G05G 9/047; G06F 3/0338; G06F 3/038; A61G 2203/14

USPC .................. 701/1, 49, 50; 700/85; 345/161; 463/38; 74/471 XY

See application file for complete search history.

(56) References Cited

U.S. PATENT DOCUMENTS

| | | | |
|---|---|---|---|
| 5,724,068 | A | 3/1998 | Sanchez |
| 6,020,875 | A | 2/2000 | Moore |
| 6,166,723 | A | 12/2000 | Schena |
| 8,264,458 | B2 | 9/2012 | Cooper et al. |

(Continued)

FOREIGN PATENT DOCUMENTS

| | | |
|---|---|---|
| EP | 2199530 | 6/2010 |

OTHER PUBLICATIONS

European Search Report for European Application No. 14 17 3886 mailed Jan. 23, 2015.

*Primary Examiner* — Jaime Figueroa

(74) *Attorney, Agent, or Firm* — RMCK Law Group, PLC

(57) ABSTRACT

The present invention is related to a control system for controlling the movement of an aerial apparatus, in particular for controlling a turnable ladder of a firefighting vehicle, comprising a manually operable input device that is deflectable in at least one spatial direction by a deflecting force, an processing unit for converting the amount of deflection of the input device into a corresponding speed signal and an actuating unit for moving the aerial apparatus with a speed corresponding to the speed signal. The invention is characterized by determining means for determining a possible maximum speed and restricting means for counteracting or limiting the deflection of the input device according to the determined possible maximum speed.

8 Claims, 1 Drawing Sheet

(56) References Cited

U.S. PATENT DOCUMENTS

| | | | | |
|---|---|---|---|---|
| 2003/0158635 | A1* | 8/2003 | Pillar | A62C 27/00 701/1 |
| 2003/0158640 | A1* | 8/2003 | Pillar | A62C 27/00 701/29.4 |
| 2004/0002794 | A1* | 1/2004 | Pillar | A62C 27/00 701/1 |
| 2007/0173987 | A1* | 7/2007 | Rowe | A62C 27/00 701/2 |
| 2007/0185625 | A1 | 8/2007 | Pillar et al. | |
| 2008/0215700 | A1* | 9/2008 | Pillar | A62C 27/00 709/212 |

* cited by examiner

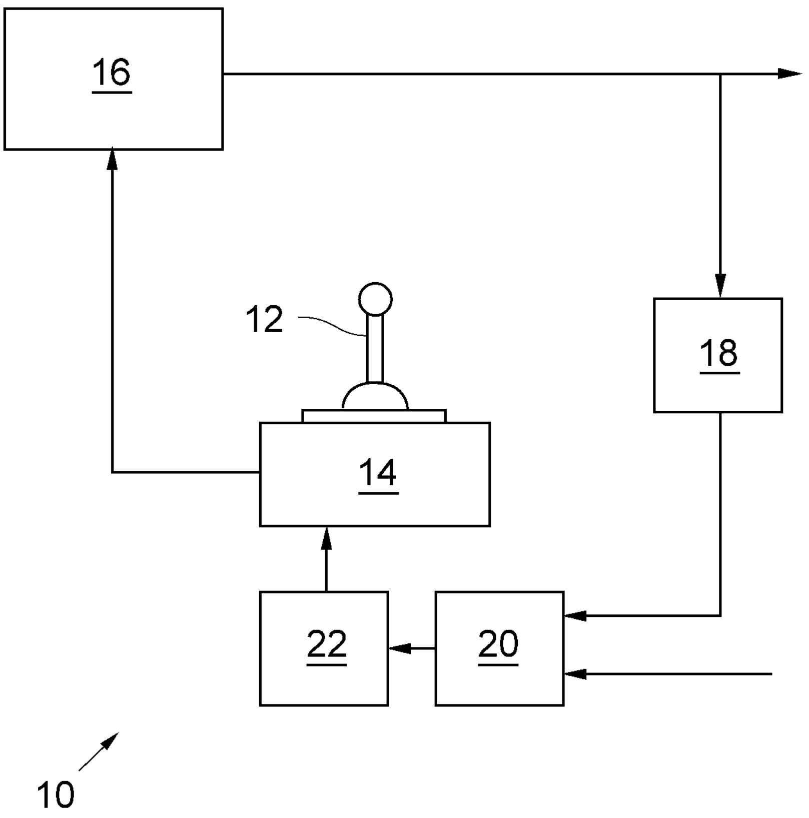
16
12
18
14
22
20
10

CONTROL SYSTEM AND METHOD FOR CONTROLLING THE MOVEMENT OF AN AERIAL APPARATUS

CROSS REFERENCE TO RELATED APPLICATIONS

This application claims priority to European Patent Application No. 14173886.4 filed on Jun. 25, 2014, the entire disclosure of which is incorporated herein by reference.

FIELD OF THE INVENTION

The present invention relates to a control system and a method for controlling the movement of an aerial apparatus, in particular for controlling a turnable ladder of a firefighting vehicle.

BACKGROUND OF THE INVENTION

Aerial apparatuses such as turnable ladders of fire-fighting vehicles are controlled by an operator from a position giving him an overview of the space in which the aerial apparatus is moved. For reason of simplicity the further description will refer to turnable ladders as one example of aerial apparatuses, although this example is not to be understood as limiting in the sense of the present invention. As it is commonly known, such turnable ladders can be turned around a vertical axis and also extracted, as well as lowered or lifted, to reach remote positions in rescue situations. It is very important to reach this remote points as fast as possible so that no time needed for the rescue of persons, etc. is lost. On the other hand, the movement speed of the turnable ladder is limited by construction parameters and also depending on its present position, especially its extension range. All these parameters cannot be overviewed by the operator in the rescue situation.

A common control station of a turnable ladder is generally provided with a manually operable input device, such as a control lever or joystick, which is deflectable in at least one spatial direction by a deflecting force applied by the operator. For example, a joystick allows to input direction and moving speed of a turnable ladder. A processing unit converts the amount of deflection of the input device into a corresponding speed signal, which is transferred to an actuating unit for moving the aerial apparatus with a speed corresponding to the speed signal.

To assist the operator in controlling the turnable ladder, systems are known with comprise sensors, for example, distance sensors at the end of the ladder to generate a warning signal to avoid a collision with an object. Other kinds of sensors protect against overloading. However, the generation of warning signals or the execution of a forced shut down of the system is only an incomplete assisting function to control the movement of the ladder. In particular there is a desire to control the ladder at maximum moving speed depending on the present situation. However, even in the presents of sensors that generate warning signals or prevent the ladder from a collision or overload, the control of the ladder still demands a control of a experienced operator and much skill to be operated in difficult situation, for example, at maximum range in a narrow space.

SUMMARY OF THE INVENTION

It is therefore an object of the present invention to provide a control system for controlling the movement of an aerial apparatus like a turnable ladder of a fire-fighting vehicle that provides a more direct feedback to the operator to simplify the control depending on the present system status.

Another object is the provision of a corresponding method for controlling the movement of an aerial apparatus. These objects are achieved by a control system comprising the features of claim 1, and a corresponding method comprising the features of claim 6.

The control system according to the present invention comprises determining means for determining a possible maximum speed for moving the aerial apparatus. The deflection of the input device is counteracted or limited by a restricting means according to determined possible maximum speed.

By this counteracting or limiting action the operator at the input device gets an immediate and intuitive haptic feedback when he applies a manual deflecting force to the input device.

For example, according to the actually determined possible maximum speed, the range of deflection of input device is limited so that a further deflection is not possible. For example, a joystick or operation lever used as an input device is restricted in its freedom of movement by the restricting means within a certain range, depending on the determined possible maximum speed. Because the determination of the maximum speed can be updated in real time, depending on the present status of the aerial apparatus, the counteraction or limitation of the deflection of the input device can be adapted dynamically. Such a haptic feedback system provides advantages over a relatively simple system that generates warning signals or just initiates an immediate shut down of the ladder movement in a case of collision danger.

According to a preferred embodiment of the present invention, the restricting means is providing to apply a restoring force according to the determined possible maximum speed to the input device acting to restore the input device against the deflecting force. This restoring force acts to set back the input device to a position corresponding to a lower speed than the possible maximum speed, and with no manual deflecting force applied, the restoring force will put the input device back into a neutral position. There are several possibilities to apply the restoring force. For example, a very strong restoring force can be applied immediately if the possible maximum speed (or a speed value just lower than the possible maximum speed) is reached, so that this strong restoring force cannot be overcome manually by the operator. According to another example, the restoring force increases gradually when the deflection of the input device approaches a limit corresponding to the possible maximum speed. This gives a more intuitive haptic feedback to the operator, enabling him to sense the approach to the maximum speed limit.

According to one preferred embodiment of the present invention, the input device is a joystick.

More preferably, the determining means comprise at least one of the following: Speed sensors, acceleration sensors, load sensors, deflection sensors, and distance sensors for determining the distance to an object.

According to another preferred embodiment of the invention, the determining means is provided to determine a possible maximum speed on the basis of measured sensor data and predetermined data related to construction parameters of the aerial apparatus to be controlled.

The invention further relates to a method for controlling the movement of an aerial apparatus, in particular for controlling a turnable ladder of firefighting vehicle, wherein a manually operable input device is deflected in at least one spatial direction by a deflecting force, the amount of deflection of the input device is converted into a corresponding speed signal, and the aerial apparatus is moved with a speed corresponding to the speed signal, wherein the possible maximum speed is determined, and the deflection of the input device is counteracted or limited according to the determined possible maximum speed.

Preferably a restoring force according to the determined possible maximum speed is applied to the input device acting to restore the input device against the deflecting force.

According to another preferred embodiment of the method according to the present invention, a possible maximum speed is determined on the basis of measured sensor data and predetermined data related to construction parameters of the aerial apparatus to be controlled.

These and other aspects from the invention will be apparent from and elucidated with reference to a preferred embodiment of the invention described hereinafter.

BRIEF DESCRIPTION OF THE DRAWING

The only FIG. 1 is a schematic view of the layout of an embodiment of a control system for controlling the movement of an aerial apparatus according to the present invention.

DETAILED DESCRIPTION OF THE INVENTION

The control system 10 shown in the FIGURE is provided for controlling a turnable ladder of a firefighting vehicle as one example of an aerial apparatus. It is noted that the control system according to the present invention is not restricted to the control of such turnable ladders but is applicable also to other kinds of aerial apparatuses. The control system 10 comprises a joystick 12 as one embodiment of an input device which is manually operable. As commonly known, the joystick 12 is deflectable in different spatial directions (e.g., up, down, left and right) by a deflection force that can be applied manually by an operator (not shown). Thus, the joystick, which is shown in a neutral central position can be deflected by tilting it sidewards. This tilting movement comprises a direction component, defined by the direction into which the joystick 12 is deflected, and an absolute value corresponding to the amount of deflection, corresponding to an intended speed of movement into the given direction. The amount of deflection of the joystick 12 is converted into a corresponding speed signal by means of processing unit 14, which senses the direction of deflection of the joystick 12 as well as the amount of its deflection and converts it into a corresponding electric speed signal, which is output by the processing unit 14 and input into an actuating unit for moving the turnable ladder with a speed corresponding to the present speed signal. For example, the actuating unit 16 is a hydraulic unit that outputs a hydraulic pressure for moving the turnable ladder into the given direction with a speed given by the corresponding speed signal. The actuating unit 16 can also comprise electric motors or other kinds of actuators or driving units.

By the arrangement described above, the amount of deflection of the input device is turned into a corresponding movement of the turnable ladder with a speed determined by the deflection of the input device.

To each aerial apparatus, like a turnable ladder in the present embodiment, there are certain restrictions for a speed of movement, depending on different parameters, like the extension range of the turnable ladder, the present acceleration at different points, the mechanical load, for example, the weight measured at the tip of the ladder, bending forces acting on the ladder, etc. One further speed limiting factor may also be the distance of the ladder to an external object. For example, it could be determined to move the ladder slowly near an object, to prevent the danger of a collision of the ladder with the object.

To determine the possible maximum speed for the movement of the ladder, determining means are provided that comprise sensors 18, like speed sensors, acceleration sensors, weight sensors, load sensors and/or distance sensors for determining a distance to an object. The determining means may further comprise a calculation unit 20 for calculating a possible maximum speed from the sensor data measured by the sensors 18 and/or by other predetermined data related to construction parameters of the turnable ladder to be controlled.

The control system 10 further comprises restricting means 22 for counteracting the deflection of the joystick 12 according to the possible maximum speed determining by the determining means 18, 20. In the present embodiment, this counteraction is provided by applying a restoring force according to the determined possible maximum speed to the joystick 12. This restoring force acts to restore the joystick 12 against the deflecting force applied manually by the operator. By the application of the restoring force, the joystick 12 is forced back into its neutral position to decrease the amount of its deflection and the lower the speed set by the joystick 12. The restoring force gives a haptic feedback to the operator, because the operation of the joystick 12 is only possible against the restoring force applied by the restriction means 22. For this purpose, the restriction means 22 may comprise motors or any other driving means to apply the restoring force. The force applied by these motors or driving means is set according to determined possible maximum speed, as described before.

In the present control system 10, there is a direct feedback informing the operator about the present speed situation of the turnable ladder, because the possible maximum speed is determined in real time and for the present operation situation and he is informed immediately at any point of time about the possible maximum speed. Exceeding the present possible maximum speed can be prevented effectively by applying a restoring force that is high enough. This direct feedback effect can also be described as a "force feedback".

According to a different embodiment of the present invention, the restricting means 22 is provided to limit the deflection of the input device according to the determined possible maximum speed. In this embodiment the input device, like a joystick 12, can be moved within certain limits freely and without the application of any restoring force. However, the limits of this movement are set according to the possible maximum speed that has been determined by the determining means 18, 20 on the basis of the sensor data and predetermined data related to construction parameters of the aerial apparatus to be controlled. According to the present situation of the aerial apparatus, the limits of the movement of the input device can be adapted dynamically in real time corresponding to the present possible maximum speed.

In the control system 10 of this embodiment, the joystick 12 as one example of a manually operable input device is deflected in at least one spatial direction by a deflection force applied by an operator, and the amount of deflection of the input device is converted into a corresponding speed signal. The turnable ladder is one example of the aerial apparatus is moved with a speed corresponding to the speed signal. During operation, a possible maximum speed of movement of the aerial apparatus is determined, and the deflection of the input device is counteracted or limited according to determined possible maximum speed.

In the present embodiment the restoring force according to the determined possible maximum speed is applied to the joystick 12 acting to restore the joystick 12 against the deflecting force applied by the operator. The possible maximum speed can be determined on the basis of measured sensor data and predetermined data related to construction parameters of the aerial apparatus to be controlled.

This invention can be implemented advantageously in a computer program comprising program code means for performing one or more steps of such method, when such program is run on a computer. For this reason the patent shall also cover such computer program and the computer-readable medium that comprises a recorded message, such computer-readable medium comprising the program code means for performing one or more steps of such method, when such program is run on a computer.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the spirit and scope of the invention are deemed to be covered by this invention.

Further implementation details will not be described, as the man skilled in the art is able to carry out the invention starting from the teaching of the above description.

The invention claimed is:

1. A control system for controlling the movement of an aerial apparatus, in particular for controlling a turnable ladder of a firefighting vehicle, the control system comprising:

a manually operable input device that is deflectable in at least one spatial direction by a deflecting force, a processing unit for converting the amount of deflection of the input device into a corresponding speed signal and an actuating unit for moving the aerial apparatus with a speed corresponding to the speed signal, determining means for determining a maximum speed for moving the aerial apparatus, and restricting means for counteracting or limiting the deflection of the input device according to the determined maximum speed.

2. The control system according to claim 1, wherein the restricting means is provided to apply a restoring force according to the determined maximum speed to the input device acting to restore the input device against the deflecting force.

3. The control system according to claim 1, wherein the input device is a joystick.

4. The control system according to claim 1, wherein the determining means comprise at least one of the following: speed sensors, acceleration sensors, load sensors, deflection sensors, and distance sensors for determining a distance to an object.

5. The control system according to claim 4, wherein the determining means is provided for determining a maximum speed on the basis of measured sensor data and predetermined data related to construction parameters of the aerial apparatus to be controlled.

6. A method for controlling the movement of an aerial apparatus, in particular for controlling a turnable ladder of a firefighting vehicle, the method comprising the steps of:

deflecting a manually operable input device associated with the aerial apparatus in at least one spatial direction by a deflecting force;

converting the amount of deflection of the input device into a corresponding speed signal; and moving, with an actuating unit, the aerial apparatus with a speed corresponding to the speed signal, wherein a maximum speed for moving the aerial apparatus is determined, and the deflection of the input device is counteracted or limited according to the determined maximum speed.

7. The method according to claim 6, wherein a restoring force according to the determined maximum speed is applied to the input device acting to restore the input device against the deflecting force.

8. The method according to claim 7, wherein a maximum speed is determined on the basis of measured sensor data and predetermined data related to construction parameters of the aerial apparatus to be controlled.

* * * * *